United States Patent [19]

Nakasaki

[11] Patent Number: 4,802,547

[45] Date of Patent: Feb. 7, 1989

[54] GOLF CART

[75] Inventor: Eiji Nakasaki, Kakogawa, Japan

[73] Assignee: Sumitomo Rubber Industries, Ltd., Kobe, Japan

[21] Appl. No.: 136,565

[22] Filed: Dec. 22, 1987

[30] Foreign Application Priority Data

Dec. 26, 1986 [JP] Japan .................................. 61-311327

[51] Int. Cl.$^4$ .......................... B62D 61/08; B60C 9/02
[52] U.S. Cl. .................................. 180/216; 152/209 R;
152/210; 152/548; 280/DIG. 5
[58] Field of Search ............... 152/209 R, 210, 209 D,
152/526, 548, 559, 560, 561; 180/65.1, 210–216,
15, 16; 224/274; 280/DIG. 5, 29, 62

[56] References Cited

U.S. PATENT DOCUMENTS

| | | | |
|---|---|---|---|
| 2,836,253 | 5/1958 | Lovell | 280/DIG. 5 |
| 2,904,093 | 9/1959 | Kroon | 152/210 |
| 3,098,516 | 7/1963 | Vasiljevic | 152/210 |
| 3,125,147 | 3/1964 | Hakka | 152/210 |
| 4,508,188 | 4/1985 | Duke | 180/210 |
| 4,573,549 | 3/1986 | Pankow | 280/DIG. 5 |

OTHER PUBLICATIONS

Popular Science, Jul. 1959, p. 162.

Primary Examiner—Michael W. Ball
Assistant Examiner—Geoffrey L. Knable
Attorney, Agent, or Firm—Birch, Stewart, Kolasch & Birch

[57] ABSTRACT

A golf cart having: a front wheel including a low pressure tire of which the tread is provided with a plurality of circumferentially extending grooves; and a rear wheel including a low pressure tire of which the tread is substantially smooth but provided with a plurality of spikes, and the low pressure tire is inflated to a low air pressure of 0.1 to 1.0 kg/cm$^2$. The golf cart is characterized by the grooves extending substantially straight in the circumferential direction of the tire; the tire of the front wheel comprising a carcass of a bias construction; and the tire of the rear wheel comprising a carcass of a radial construction without a belt for stiff reinforcement beneath the tread.

3 Claims, 3 Drawing Sheets

GOLF CART

BACKGROUND OF THE INVENTION

The present invention relates to a golf cart having wheels with specific constructions for mitigating the damage to grass, while maintaining its shock absorbing performance and maneuverability in a good condition.

Recently, there is a desire to use golf carts, running on fair ways with players or the caddie, in golf play in order to reduce their labor or to help out a shortage of caddies.

Such carts are however, liable to damage the lawn on the fair ways. Therefore, it has been tried to use a slow starter which prevents abrupt starting to reduce kick-out force of the tire, and tried to reduce the weight of the cart.

But the effect of preventing damage to the lawn has never been sufficient and caused a big obstacle against introducing and spreading of the golf carts.

SUMMARY OF THE INVENTION

It is therefore, an object of the present invention to provide a golf cart being able to largely decrease the damage to the lawn while obtaining a good driving stability and good shock absorbing performance.

According to one aspect of the invention, the golf cart has: a front wheel including a pneumatic tire, which is inflated to a low air pressure of 0.1 to 1.0 $kg/cm^2$, and the tread of which is provided with a plurality of circumferentially extending grooves; and a rear wheel including a pneumatic tire of which the tread is smooth but provided with a plurality of spikes for traction.

DETAILED DESCRIPTION OF THE INVENTION

An embodiment of the present invention will now be explained in detail in connection with the drawings.

Figure 1:
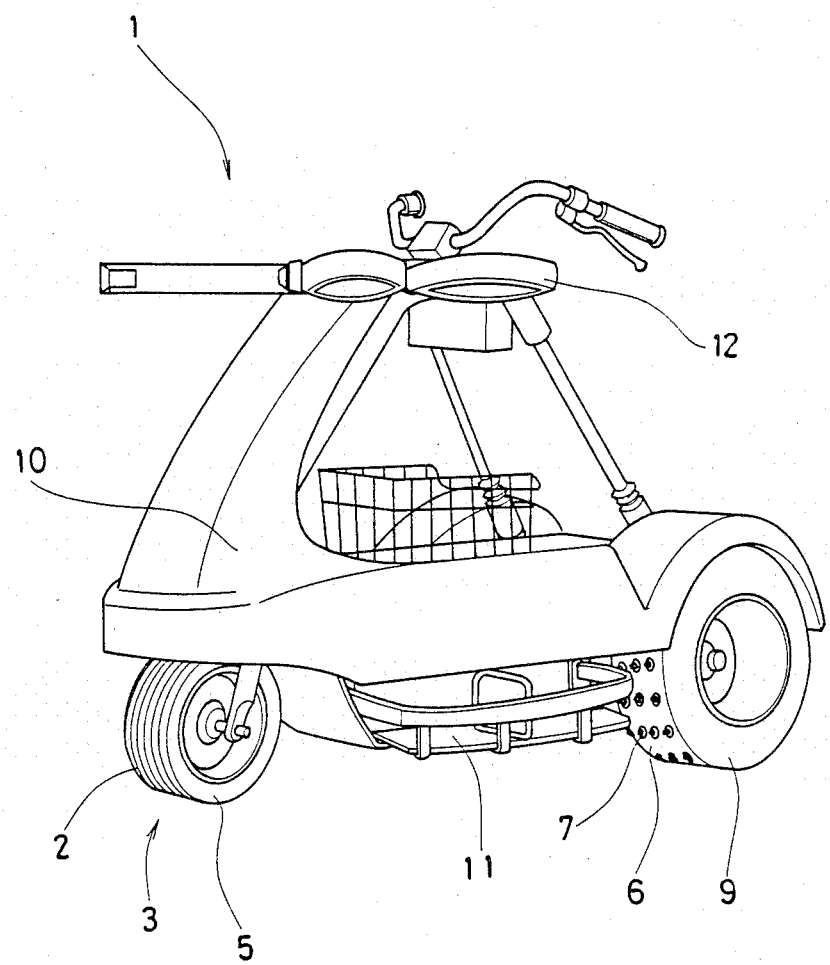
FIG. 1 is a perspective view showing an embodiment of the present invention.

In FIG. 1, the golf cart 1 of this embodiment is one of a three-wheeler that has a main body 10 provided with a front steering wheel and two rear driving wheel. The main body 10 is equipped on each the side with a carrier 11 for loading golf bag and fastening belt 12 for the loaded bag, and further the main body is provided in its rear part with a footboard for the driver. The front steering wheel, is steered toward the running direction by a handlebar, and includes a front pneumatic tire 5. The rear driving wheels are driven by a motor, and each of them includes a rear pneumatic tire 9.

Figure 2:
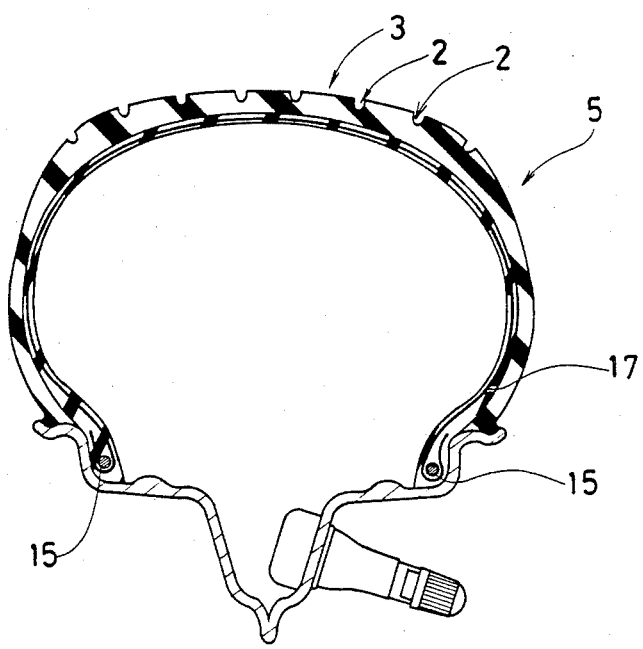
FIG. 2 is a sectional view showing the tire of the front wheel thereof.
Figure 4:
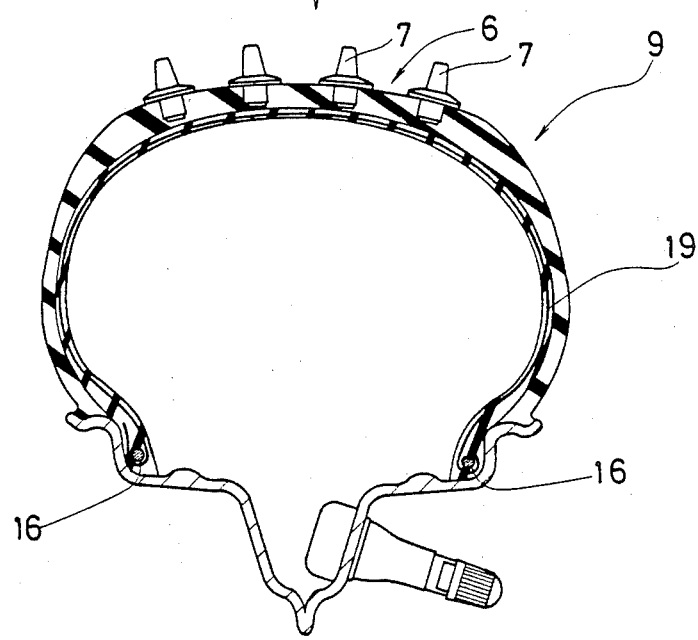
FIG. 4 is a sectional view showing the tire of the rear wheel of the embodiment.

As shown in FIGS. 2 and 4, in this example, the front and rear tires 5 and 9 each comprises: a pair of beads with bead cores (15, 16); a carcass (17, 19) extending across the beads, both the ends of which are turned up around the bead cores (15, 16); and a tread (3, 6) on the carcass.

The above mentioned carcass 17 of the front tire 5 for steering wheel is of a cross ply construction. That is, the carcass cords are arranged at an angle of 25° to 45° with respect to the equatorial plane of the tire.

On the contrary, the carcass 19 of the rear tire 9 for driving wheel is of a radial construction, wherein the carcass cords are arranged at an angle of 90° or nearly 90° with respect to the equatorial plane of tire. Although the rear tire 9 is one of a radial tire as mentioned above, no belt layer for reinforcing the tread 6 is provided between the tread 6 and the carcass 19: the tire is of so called beltless radial type.

Further, the cords of the carcasses 17 and 19 are composed of organic fibers such as nylon, aromatic polyamide, polyester, rayon, or the likes.

Figure 3:
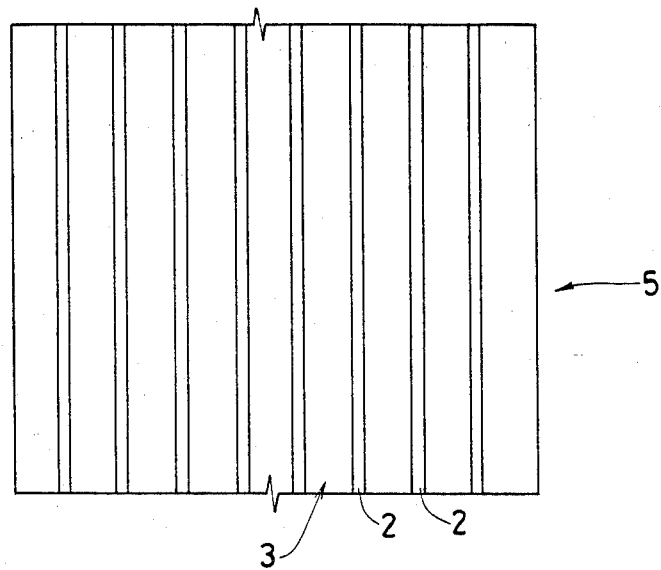
FIG. 3 is a segmental view of the tread thereof.

As shown in FIG. 3, the tread 3 of the front tire is provided with comparatively narrow and shallow parallel grooves 2 extending straight in the circumferential direction of the tire.

Figure 5:
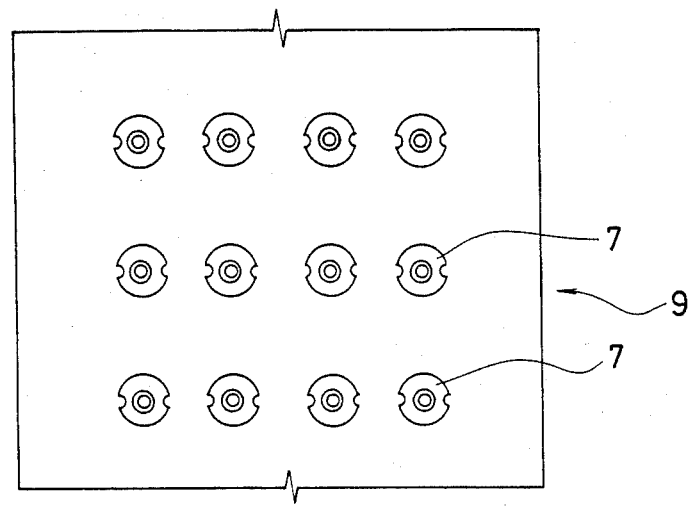
FIG. 5 is a segmental view of the tread thereof.

On the contrary, as shown in FIG. 5, the tread 6 of the rear tire 9 is provided with no groove. Accordingly, there is substantially no roughness, that is, the tread is slick. The tread 6 is however, provided with a plurality of spikes 7 at regular or irregular pitch so that the spikes project therefrom. For the above mentioned spike 7, the spike used conventionally for golf shoes is suitable.

In addition, usually the above mentioned tire is made with natural or synthetic rubber, but it can be made with various kinds of elastomer.

Furthermore, the above mentioned front and rear pneumatic tires 5 and 9 are inflated to a low inner pressure of 0.1 to 1.0 $kg/cm^2$, more preferably 0.1 to 0.5 $kg/cm^2$.

As described above, the air pressure of the front and rear tires are very low, and the rear tire 9 is of a beltless radial construction. Accordingly, the ground contacting area of the treads 3 and 6 become wider, and the ground pressure of the front and rear wheels becomes very low and uniform, thereby preventing turf leaves from being cut off. In addition, the radial spring coefficient of the tires becomes low, in consequent of which the shock absorbing power and the enveloping power are elevated.

Further, the straight grooves 2 are provided on the tread 3 of the front tire. Accordingly, the front steering wheel excels in straight running. As the result of the cart has good directional stability and good maneuverability. The grooves scarcely make a rut and cut off the turf leaves by virtue of the above mentioned lowered ground pressure.

On the other hand, in the rear driving wheel, the tread 6 of the rear tire is slick type without roughness excepting the spikes, which project from the tread surface. Accordingly, a strong traction is gained without hurting the lawn, and running on steep slope is made possible.

Furthermore, the carcass 17 of the rear tire 9 is of a radial ply construction presenting a small lateral rigidity to reduce the cornering force. Accordingly, there is absorbed by the tire sidewalls a relative movement of the main body 10 to the ground caused by centrifugal force at the time of cornering. As the result, the slipping between the tread and the lawn in the lateral direction is prevented, and the spikes will not being dragged laterally. Therefore, the preventing effect to the lawn damage may be further elevated.

On the contrary, the carcass 19 of the front tire 5 is of a cross ply construction presenting a large lateral rigidity. Accordingly, the camber thrust that is the counter force to recover inclination of the main body 10 may be increased, and driving stability will be improved.

In addition, in the present invention, for the front tire of the front steering wheel, in addition to the above mentioned straight groove, a smoothly continuous wavy groove is also applicable. For the front steering wheel, a beltless radial tire or a belted radial tire may be applicable. In such the case, in order to increase the lateral rigidity of the tire, and to maintain the driving stability, it is preferable to increase the thickness of the tire gradually from the tire crown part to the bead part. For the rear driving wheel, there may be applicable a semi-radial tire having a carcass of which the cord angle to the tire equatorial plane is comparatively large, for instance, 65° to 75°, or a belted radial tire, wherein a belt of organic fiber cords is disposed between the radial carcass and the tread. For the front or rear tire, it is possible to add bead reinforcing member, such as, cord layer or bead apex rubber. Furthermore, it is also possible to use what is called cordless tire, that is, a tire without any reinforcing cord member.

(Effects of the Invention)

As mentioned above, the golf cart of the present invention has a front wheel including a low pressure tyre the tread of which is provided with a plurality of circumferentially extending grooves; and a rear wheel including a low pressure tire of which the tread is substantially smooth and provided with a plurality of spikes. Accordingly, the ground pressure of the front and rear wheels becomes very low and uniform, and the tread surface becomes a one continuing smoothly along the running direction. Therefore, the damage to the lawn by cutting off turf leaves is reduced. In addition, the cart excels in shock absorbing power and enveloping power.

Furthermore, the front wheel and the rear wheel include the bias tire and the beltless radial tire, respectively. Therefore, the driving stability is improved, and the power for preventing the damage to the lawn is further enhanced because the lateral dragging of the spikes by the turning of the cart is reduced.

I claim:

1. A golf cart having: a front wheel including a tire which is inflated to a low air pressure of 0.1 to 1.0 $kg/cm^2$, having a carcass of a bias ply construction and the tread of which is provided with a plurality of circumferentially extending grooves; and a rear wheel including a beltless tire which is inflated to a low air pressure of 0.1 to 1.0 $kg/cm^2$, having a carcass of a radial ply construction and the tread of which is substantially smooth and provided with a plurality of spikes for traction.

2. The golf cart of claim 1, wherein said grooves extend substantially straight in the circumferential direction of the tire.

3. A golf cart having a steering wheel and a driving wheel, said steering wheel including a tire, which is inflated to a low air pressure of 0.1 to 1.0 $kg/cm^2$, having a carcass of a bias ply construction and the tread of which is provided with a plurality of parallel grooves extending continuously and substantially straight in the circumferential direction and of the tire; and said driving wheel including a beltless tire which is inflated to a low air pressure of 0.1 to 1.0 $kg/cm^2$, having a carcass of a radial ply construction and the tread of which is substantially smooth and provided with a plurality of spikes for traction.

* * * * *